United States Patent [19]

Rucci et al.

[11] Patent Number: 4,639,781
[45] Date of Patent: Jan. 27, 1987

[54] DYNAMIC GAIN ADJUSTER FOR AN IMAGE SCANNER

[75] Inventors: Norman M. Rucci, Howell; Helmuth O. Sautter, Middletown, both of N.J.

[73] Assignee: AT&T Information Systems, Murray Hill, N.J.

[21] Appl. No.: 703,235

[22] Filed: Feb. 19, 1985

[51] Int. Cl.⁴ ............... H04N 5/14; H04N 3/14; H04N 1/40
[52] U.S. Cl. .................. 358/163; 358/166; 358/167; 358/213; 358/284
[58] Field of Search ............ 358/163, 166, 167, 213, 358/284

[56] References Cited

U.S. PATENT DOCUMENTS

| | | | |
|---|---|---|---|
| 4,200,934 | 4/1980 | Hofmann | 358/163 |
| 4,298,887 | 11/1981 | Rode | 358/163 |
| 4,343,021 | 8/1982 | Frame | 358/213 |
| 4,386,434 | 5/1983 | Gibson et al. | 455/37 |
| 4,486,781 | 12/1984 | Wilmer et al. | 358/167 |
| 4,520,395 | 5/1985 | Abe | 358/163 |
| 4,554,460 | 11/1985 | Klein | 358/284 |

Primary Examiner—Michael A. Masinick
Assistant Examiner—Cynthia Smith
Attorney, Agent, or Firm—Samuel R. Williamson

[57] ABSTRACT

A dynamic gain adjusting arrangement modifies video signals produced by image scanners to achieve high quality pictures. The arrangement compensates for amplitude distortions of the video signal caused by lens vignetting and variations in lighting conditions. The video signals are compensated for these distortions by applying continuous gain adjustment to video information generated by a photosensor and by dynamically changing the gain adjustment parameters on a line-by-line basis according to an input signal reflecting the instantaneous background level.

12 Claims, 5 Drawing Figures

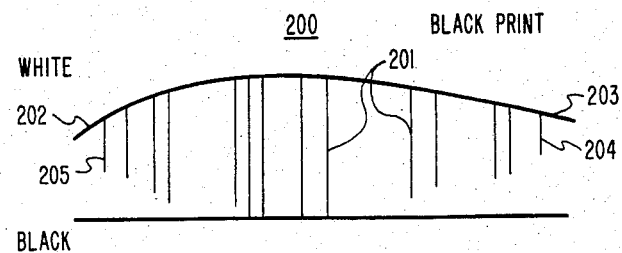
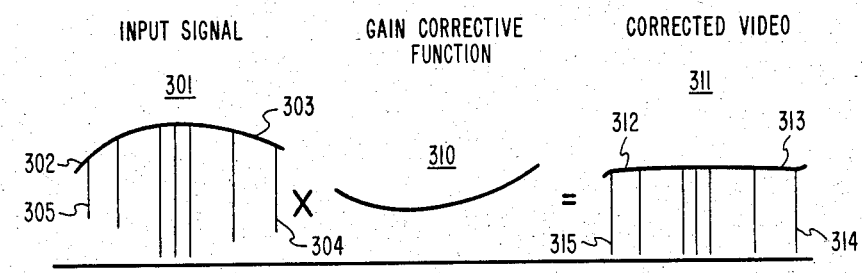
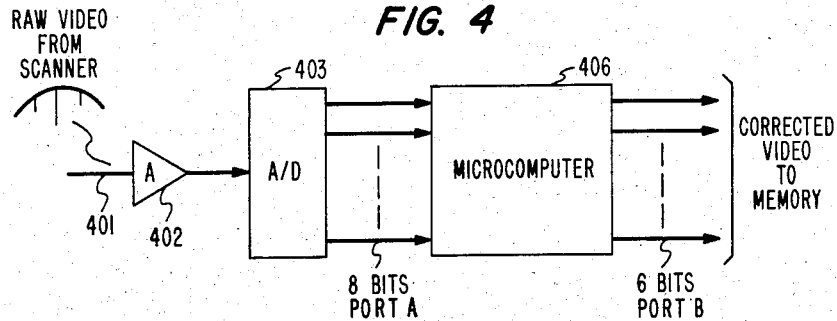

DYNAMIC GAIN ADJUSTER FOR AN IMAGE SCANNER

TECHNICAL FIELD

This invention relates to image scanner systems, and more particularly, to an arrangement for compensating for extraneous variations in a signal representing picture information in an image scanner.

BACKGROUND OF THE INVENTION

The transmission of video signals over a relatively narrow bandwidth channel at a relatively slow rate, known commonly as facsimile transmission, can with sufficient coding and decoding apparatus preserve both point-to-point detail and point-to-point intensity variations of picture information. If the picture information is sensed by a scanning device having an unenclosed target area, room ambient light can fall upon the object to be scanned. Since the intensity of the room lighting is generally not uniform throughout the room and is also subject to change, exposure of a document or other graphic material to this lighting often produces unwanted amplitude variations in the image signal. These variations may be considered as distortions since amplitude variations in the image signal should relate only to visual details of graphic material being scanned. Amplitude distortion of the signal from the image scanning device also results from certain characteristics of the optical path components such as the lens, and self-contained lighting souces.

Image scanner systems generally operate in a digital fashion in which one or more bits are used to represent a picture element. The electronic decision-making process that determines the presentation of a picture element representing a region, as, for example, either black or white, is begun by scanning an image scene whose signal amplitudes represent the intensities of shade areas in the image. When the intensity of these regions exceed an arbitrary threshold, they are transmitted as signals of a first state, e.g., "on" pulses. Those regions whose intensities fail to exceed the threshold are transmitted as signals of a second state, e.g., "off" pulses. A simple fixed threshold, however, is generally not sufficient to adequately define all the regions of the images of graphic materials.

Methods of signal correction in image scanners are known. Some scanners achieve an improvement in image quality by employing shaped thresholds for determining picture detail. Other methods involve tailoring the signal so that a linear threshold may become the basis for comparison. Both methods, however, may neglect one or more of the following degadations: The effects of nonuniform lighting, lens vignetting, and the resulting change in modulation transfer function values.

In view of the foregoing, it is desirable to have an image scanner adaptable to changes in room ambient light conditions such that it automaically adjusts for changes in brightness and signal levels. It is also desirable to have an image scanner that compensates for lens vignetting and thereby uniformly defines the information regions on a document.

SUMMARY OF THE INVENTION

In the present invention, a microcomputer-controlled image scanner includes a dynamic gain adjusting arrangement for achieving high quality pictures for use locally and for transmission in a graphics communication system. The arrangement compensates for amplitude distortions of a video signal caused by variations in room lighting conditions, lens vignetting, and the resulting variations in modulation transfer function values. By applying continuous gain adjustment to video information generated by a photosensitive array and by dynamically changing the gain factors on a line-by-line basis according to an input signal reflecting the instantaneous background level, the video signals are compensated for amplitude variations that do not represent picture information.

BRIEF DESCRIPTION OF THE DRAWING

The invention will be more clearly understood from a consideration of the following detailed description of the illustrative embodiment of the invention and the accompanying drawing in which:

FIG. 2. illustrates a typical line sensor response when one line of a document is scanned by the immage scanner of FIG. 1;

FIG. 3. illustrates a scanned line response waveform of the image scanner, a gain corrective function, and the resulting line response waveform when the gain corrective function is applied to the scanned line by he dynamic gain adjusting arrangement in accordance with the present invention;

FIG. 4. illustrates the major functional components of the dynamic gain adjusting arrangement and shows the circuit relationship of this arrangement to circuitry of the image scanner of FIG. 1 and;

DETAILED DESCRIPTION

Figure 1:
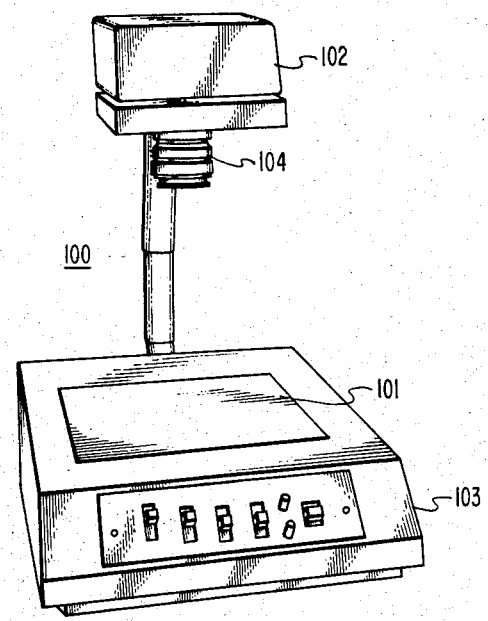
FIG. 1. is a pictorial representation of a typical image scanner for providing the image signal in accordance with the invention.

Referring now to FIG. 1, thereis shown an image scanner 100 for reproducing a digital image of an object or document containing, for example, graphic designs, notes, charts or text. The target area 101 is illuminated from above by a light source in 102 for nontransparent objects and from below in base 103 for transparent objects. Translation of picture information from the document to video signal levels is done by a stepper-driven linear array of photodiodes. The array is electrically scanned for horizontal information as it is mechanically stepped though the plane of image height.

The scanner includes open space between a lens 104 and the target area 101 to permit interaction with the document by a user. These documents are scanned while face up (right reading) to further enhance the interaction. This type scanner is therefore designed to encourage the use of visual displays in teleconference-type meetings but requires special signal conditioning in normal operation because the documents are exposed to room illumination during the scanning process. The user also causes illumination of the document to vary as he or she moves about during the scanning process.

FIG. 2 shows a waveform 200 of a typical line sensor response when one line of a document is scanned by the image scanner shown in FIG. 1. In FIG. 2, wherein a reproduction of only black and white detail is considered, white is represented as up, black is down. The vertical extending lines 201 comprise the black print signal for this scan line. The "done" nature of the sensor output from the graphics scanner 100 is due to nonuniform imaging of the lens in the scanner, particularly at the edges 202 and 203 (vignetting). This is because a lens is, in general, less efficient at its field edges than at its center. Also, the "black" print signal 204 and 205 near the edges of the field does not extend to the base line. This is due to a reduced modulation transfer function of the lens at the field edge.

To correct for the sensor output of the image scanner, a gain corrective function 310 illustrated in FIG. 3 is usd to modify a sensor scan line waveform 301 such that it is transformed into the waveform 311. The gain corrective function 310 not only causes the "white" signal at the field edges 302 and 303 to increase towards maximum white, as shown in waveform 311 as field edges 312 and 313, but also expands the downward black excursions 304 and 305 that are shown again as excursions 314 and 315. Since both imaging deficiencies are multiplicative, function 310 is generated such that it just compensates the white signal and nearly compensates the black signal.

Referring now to FIG. 4 of the drawing, there is shown an illustrative embodiment of the dynamic gain adjusting circuit arranged for interconnecting to the circuitry of an image scanner in accordance with the invention.

Uncompensated video signals containing amplitude distortions from nonuniform object illumination and those introduced by optical-path component characteristics are connected over line 401 to the input of amplifier 402. The amplified signal is presented to an analog-to-digital converter 403.

This converter 403 is selected to provide an 8-bit digital representation of the scannery video signal to input port A of a microcomputer 406, which performs a signal adjusting process described later herein.

In accordance with the signal adjusting process, the microcomputer 406 provides at output port B a digital representation of the gain-adjusted scanner video signal. This signal is free of the amplitude distortions which resulted from illumination, vignetting and modulation transfer function effects. The 6-bit gain-adjusted signal at port B is connected directly to a digital video memory in the scanner for further normal processing and eventual display. For those scanners requiring an analog signal, it is a simple matter to convert the 6-bit digital signal to an analog signal through the use of a digital-to-analog converter.

Although 8-bits and 6-bits are used as the input to port A and the output from port B, respectively, for microcomputer 406, it is apparent that bit sizes other than these can be utilized as long as sufficient resolution for the document to be scanned is provided.

The dynamic gain adjusting circuit can be constructed from readily available commercial components. A microcomputer commercially available from Intel as Part No. 8748 can be used as the microcomputer 406 with the proper programming. Amplifiers and analog-to-digital converters are well known in the industry and are available from numerous suppliers.

Figure 5:
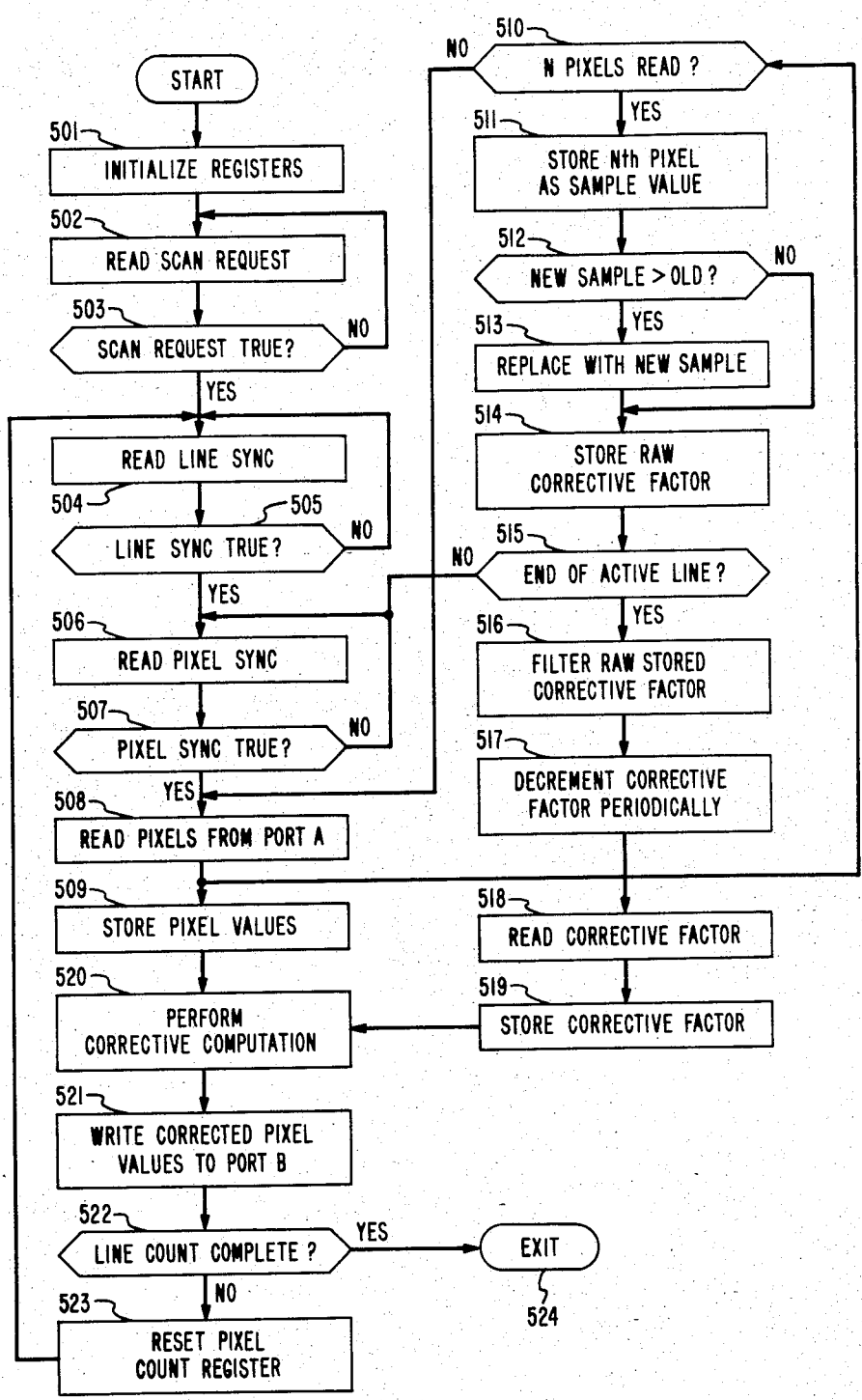
FIG. 5. depicts a flowchart of some of the functions performed by the arrangement of FIG. 4 in accordance with this invention.

Referring to FIG. 5, there is shown a flow chart illustrating some of the functions performed by the dynamic gain adjusting circuitry of FIG. 4. These functions are advantageously determined by a process or program designed for operation on a microcomputer such as microcomputer 406.

The process is entered at step 501 where the initializing parameters are set. Initialization occurs on line count completion or when power is first applied to the scanning system. Line count and pixel count registers along with other registers are set to initial values that relate to the top and side of the page to be scanned. For the very first pixel on the very first line, the initialization procedure uses an estimated value stored in memory as a corrective factor. The process provides this value as the reference upon which to adjust the signal since the dynamic gain adjusting circuitry has not received input pixel samples at this point from which it can adjust the output signal. By the time the scanner reaches the pixels on the second line, however, pixel samples have been read and the circuitry provides an optimized real time value for the corrective factor.

After initialization, the process remains in a waiting loop, step 502 and decision 503, pending the user's request for scanning. When a scan request is recognized, the process advances to step 504.

Step 504 synchronizes the timing of the dynamic gain adjusting circuitry with the internal circuitry of the scanner. The scanner requires that its electrical and mechanical operations be synchronized since the scanner is electrically scanned for horizontal information as it is mechanically stepped through the plane of image height. The initial synchronization signal of decision 503 is provided by a user activating the scan function of the scanner. After a scan request is read and determined to be true, the process next reads a line synchronization pulse at step 504 and determines if it is true at decision 505. If true, the process then advances to step 506 where a picture element synchronization pulse is detected. When the pulse is recognized in step 506 and analyzed as true in decision 507, the pixel values are read from port A of the microcomputer 406 in the next process step 508. These pixel values are then stored at step 509.

In order to obtain samples for use in construction of corrective factors, a periodic selection of the pixel values is also stored. First, N pixels are read at decision 520. Although any number of pixels may be selected, in this arrangement one out of every 12 pixels is selected for storage at step 511. Thus, the corrective value is updated once every 12 pixels. The process next advances to decision 512 to compare the pixel signal samples stored at 511. The samples at step 522 are taken along the horizontal scan line, with the highest value being considered to be white, or the background of the scanned line.

Initial calibration is not essential for proper operation of the invention since background information is continuously available throughout the document and is used as a correction factor in adjusting the white output level as well as the black output level. 640 signal samples are taken across each horizontal scan line with, as earlier indicated, 1/12 of these being used as reference values for computing the corrective function. For a given horizontal position on a scan line, a measured signal sample is compared in step 512 with the stored signal sample taken from the preceding scan line (or an earlier scan line if it had the greater magnitude) in the same relative horizontal position. If the new signal sample is greater, it is stored and replaces the previous sample at step 513. If the new sample is less than the old sample, indicating a drop in input signal level, then the process goes to step 514 with no change in corrective factor. The next process step, 515, decides whether an entire line of picture information has been scanned. If not, the process returns to step 506 to read a picture synchronization pulse. If an end-of-active line code is recognized at step 515, however, the stored raw corrective factor from step 514 is filtered at step 516. This filter routine reduces discontinuities in corrective factor values. Filtering or smoothing is achieved by the generation of an average corrective factor amplitude based on the amplitudes of adjacent samples. In operation, the average value of the adjacent samples is used with the actual sample to calculate a new amplitude which replaces that of the sample under consideration. Averaging continues for the complete set of stored amplitudes to produce a smoothed corrective factor.

The corrective factor has the desired effect of amplifying the low level samples when the signal is small and/or the lighting is low, and decreasing amplification where the signal is larger and the lighting is moderate. The white and black signals are both compensated thereby for optical distortions and changing lighting conditions. The periodic decrement routine 517 insures that the amount of compensation tracks the various amplitudes by automatically reducing the corrective factor amplitude periodically. Thus, the averaged output signal is maintained at the same general amplitude as the input signal.

The corrective factor from step 517 is read in step 518 and stored in step 519. This corrective factor is used in performing by an arithmetic procedure the corrective computation at step 520 on each of the original pixel values stored in step 509. Of the 640 pixel samples taken across each horizontal scan line, each block of 12 samples has an updated corrective factor obtained from processing the sample pixel values stores at processing step 511. In this arrangment, the corrective computation performed is multiplication by an inverse value, as illustrated by the waveform 310 in FIG. 3. Corrected pixel values are then written out in step 521 to port B of microcomputer 406.

The process advances to decision 522 to determine if the end of the page has been reached. If the scanner has not completely scanned the page, the pixel count register is reset at step 523 and the process returns to step 504. If the scanner has finished scanning the page, the process is exited at step 524.

Various modifications of this invention are contemplated and may obviously be resorted to by those skilled in the art without departing fom the spirit and scope of the invention as hereinafter defined by the appended claims.

What is claimed is:

1. A method of compensating for sensitivity variations in an image sensing device, the method comprising the steps of:
   receiving an input signal in a plurality of scanned lines from the image sensing device, the input signal being reflective of an image for display;
   determining instantaneous signal amplitude levels in the input signal, each instantaneous signal amplitude level being indicative of a particular section of the image on a scan line;
   storing in memory a plurality of the instantaneous signal amplitude levels;
   comparing first and second instantaneous signal amplitude levels on adjacent scan lines for generating a corrective factor signal, the comparing step including comparing the second instantaneous signal amplitude level with the previously received and juxtaposed first instantaneous signal amplitude level and further including the step of storing as the corrective factor signal that one of the two signal levels having the greatest amplitude; and
   averaging the corrective factor signals for each scan line, the averaging step including generating for each corrective factor signal an adjusted signal level derived from averaging a first corrective factor signal located immediately before and a second corrective factor signal located immediately after the corrective factor signal being adjusted, the average of the first and second corrective factor signal being combined with the corrective factor signal being adjusted for generating and substituting therefor the adjusted signal level, and the averaging step being applied to a plurality of corrective factor signals being adjusted for producing from the adjusted signal levels a smoothed gain corrective function for each scan line, the gain corrective function being combined with the plurality of instantaneous signal amplitude levels for producing an output signal compensated for sensitivity variations in the image sensing device.

2. A method of compensating for nonuniform lighting conditions for an image sensing device, the method comprising the steps of:
   receiving an input signal in a plurality of scanned lines from the image sensing device, the input signal being reflective of an image for display;
   determining instantaneous signal amplitude levels in the input signal, each instantaneous signal amplitude level being indicative of a particular section of the image on a scan line;
   storing in memory a plurality of the instantaneous signal amplitude levels;
   comparing first and second instantaneous signal amplitude levels on adjacent scan lines for generating a corrective factor signal, the comparing step including comparing the second instantaneous signal amplitude level with the previously received and juxtaposed first instantaneous signal amplitude level and further including the step of storing as the corrective factor signal that one of the two signal levels having the greatest amplitude; and
   averaging the corrective factor signals for each scan line, the averaging step including generating for each corrective factor signal an adjusted signal level derived from averaging a first corrective factor signal located immediately before and a second corrective factor signal located immediately after the corrective factor signal being adjusted, the average of the first and second corrective factor signal being combined with the corrective factor signal being adjusted for generating and substituting therefor the adjusted signal level, and the averaging step being applied to a plurality of corrective factor signals being adjusted for producing from the adjusted signal levels a smoothed gain corrective function for each scan line, the gain corrective function being combined with the plurality of instantaneous signal amplitude levels for producing an output signal compensated for nonuniform lighting conditions provided to the image sensing device.

3. The method of claim 1 or 2 wherein the comparison step selects a predetermined number of both first and second instantaneous signal amplitude levels on adjacent scan lines for generating the corrective factor signal.

4. The method of claim 3 wherein the predetermined number of selected first and second instantaneous signal amplitude levels comprise one of every twelve signal amplitude levels occuring on each scan line.

5. The method of claim 1 or 2 further comprising the step of periodically decrementing the corrective factor level, the decrement in step providing for detecting and averaging the lower instantaneous signal amplitude levels.

6. The method of claim 1 or 2 further including the step of combining each of the adjusted signal levels with a selected number of the plurality of instantaneous signal amplitude levels on each scan line.

7. The method of claim 6 wherein the combining step further includes combining the adjusted signal levels with the instantaneous signal amplitude levels by a multiplicative inverse function.

8. The method of claim 7 wherein in the combining step, each adjusted signal level is combined with twelve sequentially occuring instantaneous signal amplitude levels on each scan line, the adjusted signal level occuring in the gain corrective function in the same relative position as the instantaneous signal amplitude. levels occur on each scan line, the adjusted signal levels being combined with the sequentially occuring instantaneous signal amplitude levels across each scan line for providing the compensated output signal.

9. A method of compensating for sensitivity variations in an image sensing device having at least one detection element for providing signals reflective of an image in a plurality of scanned lines, the method comprising the steps of:
determining an instantaneous signal amplitude level in the detection element, the instantaneous signal amplitude level being indicative of a particular section of the image on a scan line;
storing in memory a plurality of instantaneous signal amplitude levels provided by the detection element;
comparing first and second instantaneous signal amplitude levels on adjacent scan lines for generating a corrective factor signal, the comparing step including comparing the second instantaneous signal amplitude level with the previously received and juxtaposed first instantaneous signal amplitude level and further including the step of storing as the corrective factor signal that one of the two signal levels having the greatest amplitude; and
averaging the corrective factor signals for each scan line, the averaging step including generating for each corrective factor signal an adjusted signal level derived from averaging a first corrective factor signal located immediately before and a second corrective factor signal located immediately before and a second corrective factor signal located immediately after the corrective factor signal being adjusted, the average of the first and second corrective factor signal being combined with the corrective factor signal being adjusted for generating and substituting therefore the adjusted signal level, and the averaging step being applied to a plurality of corrective factor signals being adjusted for producing from the adjusted signal levels a smoothed gain corrective function for each scan line, the gain corrective function being combined with the plurality of instantaneous signal amplitude levels for producing an output signal compensated for sensitivity variations in the image sensing device.

10. A method of compensating for nonuniform lighting conditions for an image sensing device having at least one detection element for providing signals reflective of an image in a plurality of scanned lines, the method comprising the steps of:
determining an instantaneous signal amplitude level in the detection element, the instantaneous signal amplitude level being indicative of a particular section of the image on a scan line;
storing in memory a plurality of instantaneous signal amplitude levels provided by the detection element;
comparing first and second instantaneous signal amplitude levels on adjacent scan lines for generating a corrective factor signal, the comparing step including comparing the second instantaneous signal amplitude level with the previously received and juxtaposed first instantaneous signal amplitude level and further including the step of storing as the corrective factor signal that one of the two signal levels having the greatest amplitude; and
averaging the corrective factor signals for each scan line, the averaging step including generating for each corrective factor signal an adjusted signal level derived from averaging a first corrective factor signal located immediately before and a second corrective factor signal located immediately after the corrective factor signal being adjusted, the average of the first and second corrective factor signal being combined with the corrective factor signal being adjusted for generating and substituting therefor the adjusted signal level, and the averaging step being applied to a plurality of corrective factor signals being adjusted for producing from the adjusted signal levels a smoothed gain corrective function for each scan line, the gain corrective function being combined with the plurality of instantaneous signal amplitude levels for producing an output signal compensated for nonuniform lighting conditions provided to the image sensing device.

11. A method of compensating for nonuniform lighting conditions for an image sensing device, the method comprising the steps of:
receiving an input signal reflective of an image in a plurality of scanned lines from the image sensing device:
determining instantaneous signal amplitude levels in the input signal, each instantaneous signal amplitude level being indicative of a particular section of the image on a scan line;
storing in memory a plurality of the instantaneous signal amplitude levels;
comparing the plurality of instantaneous signal amplitude levels on a scan line with those from an immediately preceding scan line for generating a corrective factor signal, the comparing step including comparing a received instantaneous signal amplitude level with a previously received instantaneous signal amplitude level and further including the step of storing as the corrective factor signal that one of the two signal levels having the greatest amplitude; and
averaging the corrective factor signals for producing a smoothed gain correction function for each scan line, the averaging step including combining and averaging each corrective factor signal with other corrective factor signals immediately proceeding and immediately following the corrective factor signal on a scan line, the averaging step being applied to a plurality of corrective factor signals for producing the smoothed gain corrective function being combined with the plurality of instantaneous signal amplitude levels for producing an output signal compensated for nonuniform lighting conditions provided to the image sensing device.

12. A method of compensating for sensitivity variations in an image sensing device, the method comprising the steps of:

receiving an input signal reflective of an image in a plurality of scanned lines from the image sensing device;

determining instantaneous signal amplitude levels in the input signal, each instantaneous signal amplitude level being indicative of a particular section of the image on a scan line;

storing in memory a plurality of the instantaneous signal amplitude levels;

comparing the plurality of instantaneous signal amplitude levels on a scan line with those from an immediately preceding scan line for generating a corrective factor signal, the comparing step including comparing a received instantaneous signal amplitude level with a previously received instantaneous signal amplitude level and further including the step of storing as the corrective factor signal that one of the two signal levels having the greatest amplitude; and averaging the corrective factor signals for producing a smoothed gain correction function for each scan line, the averaging step including combining and averaging each corrective factor signal with other corrective factor signals immediately proceeding and immediately following the corrective factor signal on a scan line, the averaging step being applied to a plurality of corrective factor signals for producing the smoothed gain corrective function for the scan line, and the gain corrective function being combined with the plurality of instantaneous signal amplitude levels for producing an output signal compensated for sensitivity variations in the image sensing device.

* * * * *